United States Patent
Carroll et al.

(10) Patent No.: US 9,274,753 B1
(45) Date of Patent: Mar. 1, 2016

(54) APPLICATION DIAGRAM TOOL

(75) Inventors: Roberta Marie Carroll, Platte City, MO (US); Carter Wayne Floyd, Jr., Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 2306 days.

(21) Appl. No.: 11/963,832

(22) Filed: Dec. 23, 2007

(51) Int. Cl.
*G06F 9/45* (2006.01)
*G06F 9/44* (2006.01)

(52) U.S. Cl.
CPC ........................................ *G06F 8/10* (2013.01)

(58) Field of Classification Search
None
See application file for complete search history.

(56) References Cited

U.S. PATENT DOCUMENTS

| | | | | |
|---|---|---|---|---|
| 5,579,478 | A * | 11/1996 | Heiserman et al. | 726/4 |
| 6,959,268 | B1 * | 10/2005 | Myers, Jr. et al. | 703/6 |
| 7,818,288 | B1 * | 10/2010 | Dickson et al. | 707/601 |
| 7,908,589 | B2 * | 3/2011 | Sattler et al. | 717/121 |
| 8,369,975 | B2 * | 2/2013 | Pettus et al. | 700/105 |
| 2003/0101145 | A1 * | 5/2003 | Fang et al. | 705/64 |
| 2004/0034846 | A1 * | 2/2004 | Ortal et al. | 717/111 |
| 2006/0059461 | A1 * | 3/2006 | Baker et al. | 717/113 |
| 2006/0095309 | A1 * | 5/2006 | Mangan et al. | 705/8 |
| 2006/0123115 | A1 * | 6/2006 | Satomi | 709/226 |
| 2007/0027810 | A1 * | 2/2007 | Longnecker et al. | 705/51 |
| 2008/0127084 | A1 * | 5/2008 | Sattler et al. | 717/121 |
| 2008/0155492 | A1 * | 6/2008 | Cole et al. | 717/100 |
| 2008/0312979 | A1 * | 12/2008 | Lee et al. | 705/7 |
| 2010/0312590 | A1 * | 12/2010 | Arunachalam et al. | 705/7 |

* cited by examiner

*Primary Examiner* — Evral Bodden (57) ABSTRACT

A system for an application diagram is provided. The system includes a technology roadmap database, an application database, a project database, a processor, an analysis module, and a user interface. The technology roadmap database contains technology roadmap information defining a technology roadmap. The application database contains configuration information about applications. The configuration information identifies the technology resources allocated to each application. The project database contains project information, which identifies any project impact on each application. The processor executes the analysis module to analyze the technology roadmap information, the configuration information, and the project information and to create the application diagram for a selected project. The application diagram organizes applications within enterprise functional areas and presents any changes planned for the selected project. The user interface, responsive to user input, promotes selection of projects and displays the application diagram for selected projects.

17 Claims, 5 Drawing Sheets

APPLICATION DIAGRAM TOOL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Enterprise architects evaluate technologies currently used by an enterprise and technologies potentially used by the enterprise. Such an evaluation may produce an approved technology list that specifies which technologies offer the best value for the enterprise in terms of purchasing and maintaining technology. Despite the production of an approved technology list, a project manager may approve a proposed project that uses a technology that is not on the approved technology list. A project may be a temporary endeavor undertaken to create a unique product or service. Implementing a technology that is an exception to the approved technology list may result in architectural impacts throughout the enterprise.

Evaluating architectural impacts may be a lengthy and difficult process. For example, employees in each of the numerous areas, or subdivisions, in the enterprise may hold their own meeting to evaluate architectural impacts. In these numerous meetings, the employees may evaluate architectural impacts in their own area without any information about how the project may impact other areas in the enterprise. The significant time that would be required to determine such information may constitute a waste of time for the many employees of areas not impacted by the project. Enterprise architects may make project decisions based on architectural impacts. However, project managers would have to lobby to overturn project decisions made by enterprise architects because the enterprise architects often fail to take all project considerations into account.

In large enterprises, the number of installed hardware and software technologies can easily number in the tens of thousands. The operational complexity of managing large portfolios of hardware and software drives significant operating expense and leads to lowered operational performance of the systems utilizing the technology.

SUMMARY

Disclosed herein are systems and methods for creating application diagrams. In some embodiments, a system includes a technology roadmap database, an application database, a project database, a processor, an analysis module, and a user interface. The technology roadmap database contains technology roadmap information defining a technology roadmap. The application database contains configuration information about applications. The configuration information identifies the technology resources allocated to each application. The project database contains project information, which identifies any project impact on each application. The processor executes the analysis module to analyze the technology roadmap information, the configuration information, and the project information and to create an application diagram for a selected project. The application diagram organizes applications within enterprise functional areas and presents any changes planned for the selected project. The user interface, responsive to user input, promotes selection of projects and displays the application diagram for selected projects.

In some embodiments, a computer implemented method for project management is provided. The method comprises analyzing information about projects, a technology roadmap, and application configurations. A first application diagram associated with a first selected time is created, based at least in part on analyzing the information, wherein the first application diagram organizes applications in a context of enterprise functional areas. A second application diagram associated with a second selected time is created, based at least in part on analyzing the information, wherein the second application diagram organizes applications in the context of enterprise functional areas. The first application diagram and the second application diagram are displayed for a comparison. A management action is identified based on the comparison.

In some embodiments, a system for creating an application diagram is disclosed. The system includes a processor, a memory, a database manager, and a user interface. The memory includes application information for applications, technology roadmap information for technologies, and project information for projects. The database manager is executed by the processor to analyze the application information, the technology roadmap information, and the project information. The database manager is also executed by the processor to create an application diagram. Application information for each application is associated with technology roadmap information for at least one of the technologies. Application information for each application is associated with project information for at least one of the projects. The application diagram organizes applications within enterprise functional areas. The user interface, responsive to user input, displays the application diagram. The user interface also displays further information that enables a user to identify a management action responsive to further user input.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Enterprises often develop projects by modifying or creating applications. An application is computer software that employs the capabilities of a computer to perform a task for a computer user. An application may be supported by enterprise technologies. In embodiments of the present disclosure, an application diagram tool analyzes each application to identify the technology resources that are allocated to the application and identify any project impact on the application. Analyzing both projects and technologies at the application level enables insights into project impacts on applications and technology support for applications. This analysis also provides insights into the relationships between projects and technologies based on the applications. The application diagram tool creates an application diagram that combines information about applications, projects, and technologies. When a user interface displays the application diagram to a user, the application diagram enables the user to identify appropriate management actions to take based on the combined information. These management actions may include modifying a plan based on a conflict between projects, based on a dependency of one project on another, based on a synergy from developing projects, or based on a risk that a technology that supports an application will become outdated. For example, the application diagram may indicate that different projects impact the same application, and each project requires conflicting technologies to be allocated for the application based on the different projects' requirements.

When a user selects an application from the application diagram, the user interface displays further information about the application, such as the operating system version, the computer model, and the database system allocated to support the application. The user may select different projects, create application diagrams for each project, and compare the application diagrams to identify an appropriate management action to take, such as prioritizing among accomplishing project deliverables. Furthermore, the user may generate reports based on the combined information about applications, projects, and technologies, and view the reports via the user interface. A user may select a report to be generated based on information displayed in an application diagram. The reports may provide some information that is similar to the information provided in an application diagram, and some information that is unique, such as a schedule for technologies to be upgraded for specific applications that are impacted by specific projects.

Figure 1:
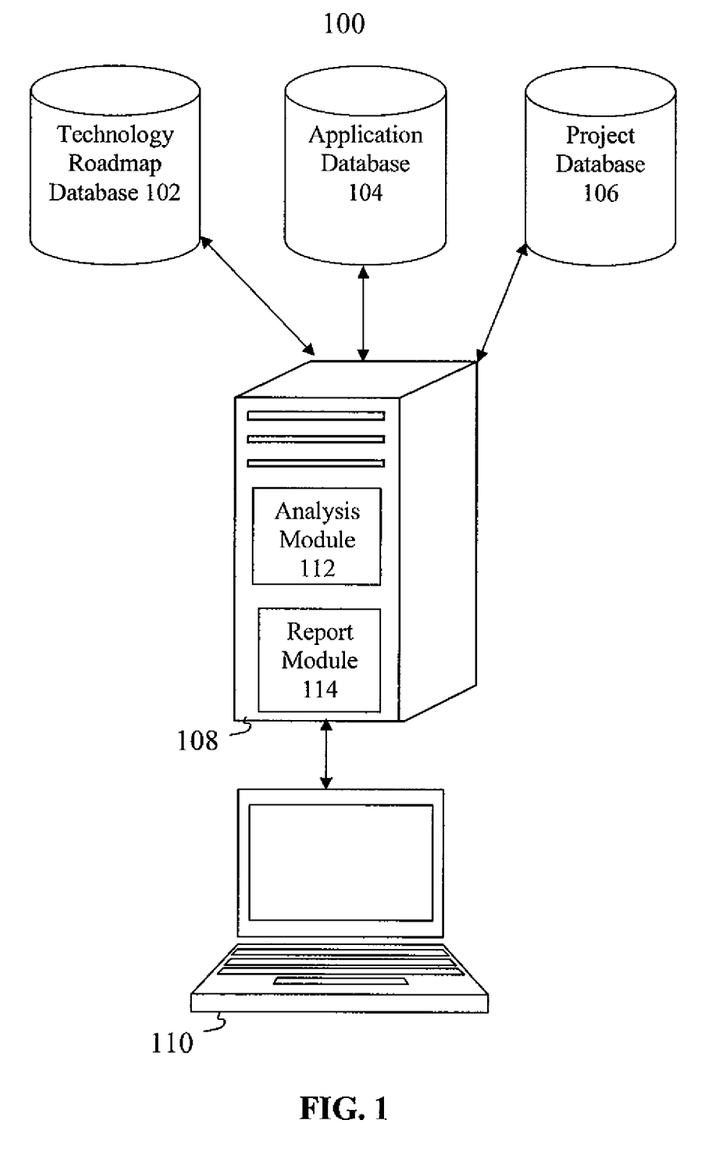
FIG. 1 shows a system for an application diagram tool according to some embodiments of the present disclosure.

Turning now to FIG. 1, a system 100 is depicted for an application diagram tool according to some embodiments of the present disclosure. The system 100 includes a technology roadmap database 102, an application database 104, a project database 106, a server 108, and a user interface 110. The server 108 communicates with the technology roadmap database 102, the application database 104, the project database 106, and the user interface 110.

The technology roadmap database 102 may identify an approved operating system version, an approved computer model, an approved data store system, an approved computer program execution framework, and other components. In an embodiment, the computer program execution framework is configured to execute a JAVA computer program, wherein the computer program is written in a platform independent architecturally neutral object-oriented programming language sold and/or distributed under the trademark of JAVA. For example, one area of an enterprise may use a first computer model that is not approved for current use, while the technology roadmap database 102 identifies a second computer model that is approved for current use and a third computer model that is scheduled for future use. In other embodiments, other development languages or platforms might be used.

The application database 104 includes configuration information about applications, where the configuration information identifies the technology resources allocated to each application. For example, the configuration information might specify that a fraud management application is executed by an approved operating system, and stores fraud management data on a data store that the technology roadmap database 102 indicates will no longer be supported in one year. The configuration information may identify the applications that are provided by third party vendors and may also include information associated with interfaces between applications. For example, the configuration information may identify information for an interface between a tax application that is provided by a third party vendor and a treasury application. The configuration information may assist project managers in identifying applications provided by third party vendors so that project managers whose projects will modify third party applications may plan contact with the third party vendors for modification approval and/or assistance. In another example, the configuration information may identify whether an interface between applications communicates data in real time or by batching and also identify the data communication rate for the interface.

The project database 106 includes project information about projects, where the project information may include any project impact on related applications. For example, the project information identifies that a payment project may also require modification of a retail analysis application, a payment plus application, and a collections application. The project information may also include a schedule for project milestone completion. For example, the project information may identify that the interface between the collections application and the payment plus application must be modified and tested three months before either the collections application or the payment plus application is modified.

The server 108 includes an analysis module 112 and a report module 114. The server 108 executes the analysis module 112 to analyze the technology roadmap information, the configuration information, and the project information, and to create an application diagram for a project. The server 108 executes the report module 114 to generate reports based on the analysis provided by the analysis module 112. The numbers and types of each component in FIG. 1 are depicted for the purpose of an illustrative example.

Figure 2:
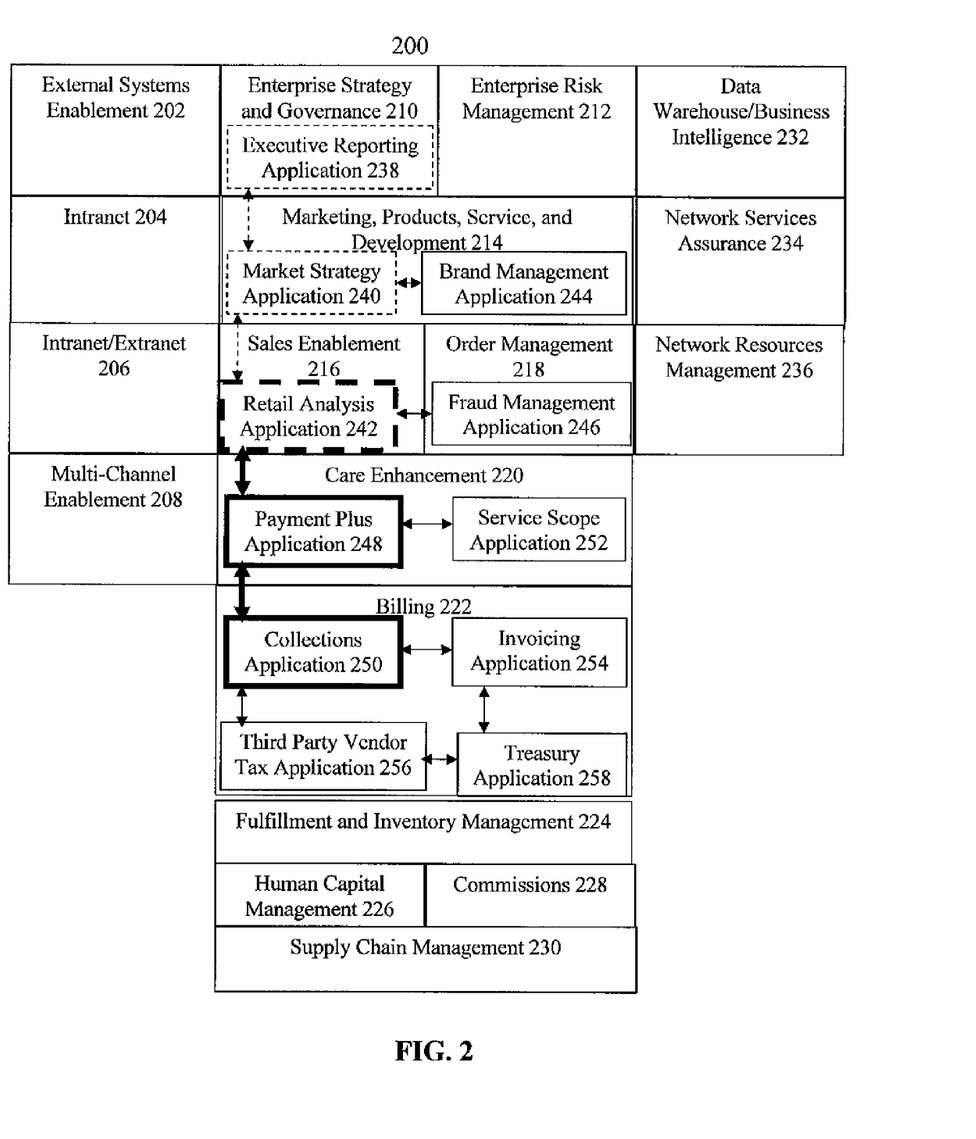
FIG. 2 shows an application diagram for a telecommunications entity, organized by functional areas, according to some embodiments of the present disclosure.

Turning now to FIG. 2, an application diagram 200 is depicted for a telecommunications entity organized by functional areas. Each functional area is a group of related applications. Embodiments of the present disclosure organize applications into groups corresponding to the functional areas to enable a more efficient evaluation. While exemplary functional areas are depicted in FIG. 2, the application diagram 200 may include any type of functional areas.

The functional areas in FIG. 2 are aligned with a standardized map for operations of a telecommunications business. Embodiments of the present disclosure use the standardized map as a framework for organizing applications. The terminology for each functional area may be loosely based on an enhanced telecom operations map (eTOM) standard to align with terminology familiar to users.

The application diagram 200 includes an external systems enablement area 202, an intranet area 204, an intranet/extranet area 206, and a multi-channel enablement area 208. The application diagram 200 also includes an enterprise strategy and governance area 210; an enterprise risk management area 212; a marketing, products, service, and development area 214; a sales enablement area 216; an order management area 218; a care enhancement area 220; and a billing area 222. The application diagram 200 further includes a fulfillment and inventory management area 224, a human capital management area 226, a commissions area 228, and a supply chain management area 230. Additionally, the application diagram 200 includes a data warehouse/business intelligence 232 area, a network services assurance area 234, and a network resources management area 236.

Each functional area may include many applications, but the application diagram 200 may display only the applications that are impacted directly or indirectly by a selected project. For example, a marketing project requires the modification of an executive reporting application 238, a market strategy application 240, and a retail analysis application 242. The executive reporting application 238 interfaces with the market strategy application 240. FIG. 2 depicts an interface between applications as arrows that point to the applications interfaced. The market strategy application 240 also interfaces with a brand management application 244 and the retail analysis application 242. The retail analysis application 242 also interfaces with a fraud management application 246 and a payment plus application 248.

If a user requests the display of the application diagram 200 for the marketing project, the application diagram 200 displays the applications to be modified by the marketing project, and the applications that interface with those applications. The application diagram 200 displays the executive reporting application 238 in the enterprise strategy and governance 210 area; both the market strategy application 240 and the brand management application 244 in the marketing, products, service, and development 214 area; the retail analysis application 242 in the sales enablement 216 area; the fraud management application 246 in the order management 218 area; and the payment plus application 248 in the care enhancement 220 area.

In another example, a payment project requires the modification of the retail analysis application 242, the payment plus application 248, and a collections application 250. The payment plus application 248 interfaces with the collections application 250 and a service scope application 252. The collections application 250 also interfaces with an invoicing application 254 and a third party vendor tax application 256. Although a treasury application 258 does not interface with any of the applications to be modified by the payment project, the treasury application 258 interfaces with both the invoicing application 254 and the third party vendor tax application 256, each of which may be impacted by the modifications to the collections application 250. Therefore, the payment project requires modifications to applications that may also result in the modification of additional applications that interface with the modified applications.

If a user requests the display of the application diagram 200 for the payment project, the application diagram 200 displays the applications that the payment project will modify, and the applications that interface with the applications to be modified. The application diagram 200 displays the market strategy application 240 in the marketing, products, service, and development 214 area; the retail analysis application 242 in the sales enablement 216 area; the fraud management application 246 in the order management 218 area; both the payment plus application and the service scope application 252 in the care enhancement 220 area; and each of the collections application 250, the invoicing application 254, the third party vendor tax application 256, and the treasury application 258 in the billing 222 area. If a user requests the display of the application diagram 200 for multiple projects, the application diagram 200 simultaneously displays the applications impacted by the multiple projects, such as the applications impacted by the marketing project and the applications impacted by the payment project.

Figure 3:
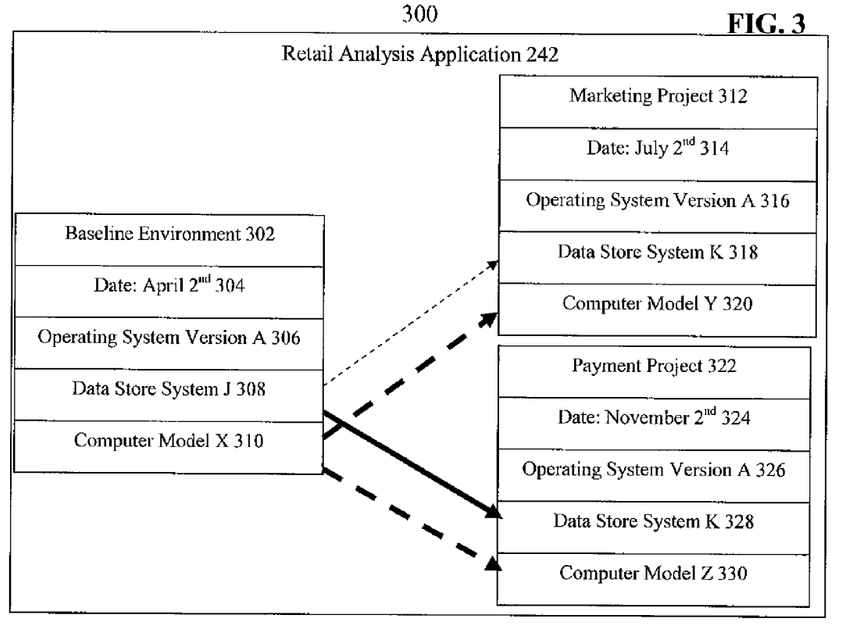
FIG. 3 shows an application diagram for a selected application according to some embodiments of the present disclosure.

Turning now to FIG. 3, an application diagram 300 for a selected application is depicted according to some embodiments of the present disclosure. If a user selects the retail analysis application 242 in the application diagram 200, the application diagram 300 displays further information, such as the configuration information, for the retail analysis application 242. The configuration information for the retail analysis application 242 includes a baseline environment 302, a date 304, and technology resources allocated to retail analysis application 242, such as an operating system 306, a data store 308, and a computer 310. The baseline environment 302 indicates the current status for the retail analysis application 242 and the date 304 of April $2^{nd}$ indicates the current date for the baseline environment 302. The operating system version A 306 indicates the current operating system version, the data store system J 308 indicates the current data store system, and the computer model X 310 indicates the current computer model.

The application diagram 300 also displays project information. The project information identifies any project impact on the selected application. The project information for the retail analysis application 242 includes a project 312, a date 314, and technology resources allocated to the retail analysis application 242 based on the project, such as an operating system version A 316, a data store system K 318, and a computer model Y 320. The marketing project 312 indicates a project that impacts the retail analysis application 242, and the date 314 of July $2^{nd}$ indicates the planned date for the impact by the marketing project 312. The operating system version A 316 indicates an operating system version planned by the marketing project 312 for the retail analysis application 242, which is the same as the operating system version A 306 that is used on April $2^{nd}$. The data store system K 318 indicates a data store system planned by the marketing project 312 for the retail analysis application 242, and the computer model Y 320 indicates a computer model planned by the marketing project 312 for the retail analysis application 242.

The project information for the retail analysis application 242 also includes a payment project 322, a date 324, and technology resources allocated to retail analysis application 242 based on the project, such as an operating system version A 326, a data store system K 328, and a computer model Z 330. The payment project 322 indicates a project that impacts the retail analysis application 242, and the date 324 of November $2^{nd}$ indicates the planned date for the impact by the project. The operating system version A 326 indicates an operating system version planned by the payment project 322 for the retail analysis application 242, which is the same as the operating version A 306 that is used on April $2^{nd}$. The data store system K 328 indicates a data store system planned by the payment project 322 for the retail analysis application 242, which is the same as the data store system K 318 planned by the marketing project 312. The computer model Z 330 indicates a computer model planned by the payment project 322 for the retail analysis application 242.

Figure 4:
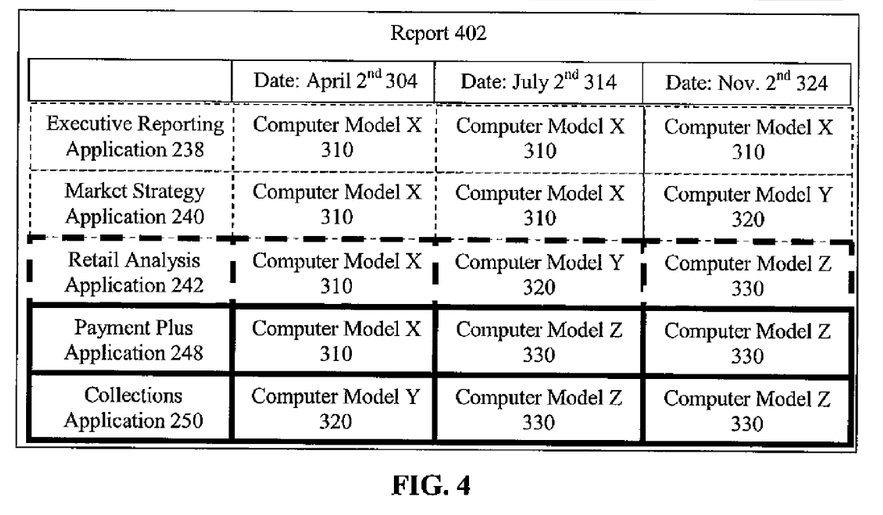
FIG. 4 shows a report according to some embodiments of the present disclosure.

Turning now to FIG. 4, a report 402 is depicted according to some embodiments of the present disclosure. A user of the user interface 110 may select applications or projects via user input, request the report 402, and view the report 402 via the user interface 110. For example, the user may want to identify which computer models are planned for use on specific dates for applications impacted by selected projects. The project information specifies that the marketing project 312 directly impacts the executive reporting application 238, the market strategy application 240, and the retail analysis application 242. The project information also specifies that the payment project 322 directly impacts the retail analysis application 242, the payment plus application 248, and the collections application 250.

In response to the user selecting the marketing project 312 and the payment project 322, the report 402 displays a row for the executive reporting application 238, a row for the market strategy application 240, a row for the retail analysis application 242, a row for the payment plus application 248, and a row for the collections application 250. In this example, the user also selects the computer models for selected projects from the technology roadmap information. The report 402 displays the current computer models in a column at the date: April $2^{nd}$ 304, the computer models for the marketing project 312 in a column at the date: July $2^{nd}$ 314, and the computer models for the payment project in a column at the date: November $2^{nd}$ 324. Continuing this example, the retail analysis application 242 uses the computer model X 310 on the date: April $2^{nd}$ 304, the marketing project 312 plans to use the computer model Y 320 for the retail analysis application 242 on the date: July $2^{nd}$ 314, and the payment project 322 plans to use the computer model Z 330 for the retail analysis application 242 on the date: November $2^{nd}$ 324.

Figure 5:
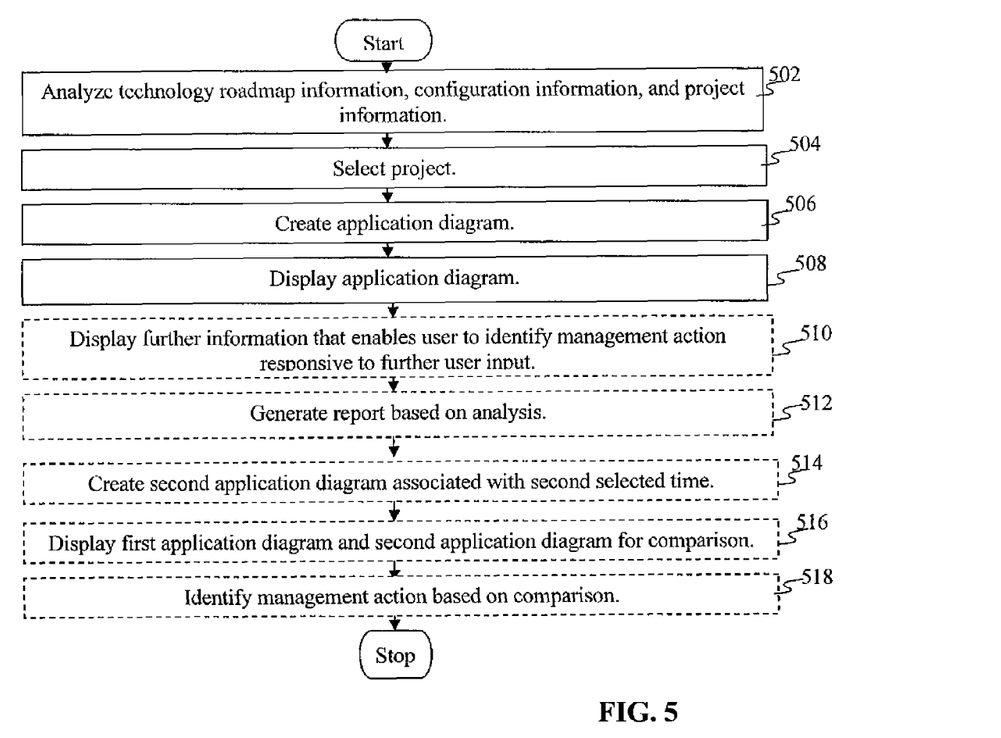
FIG. 5 shows an application diagram method according to some embodiments of the present disclosure.

Turning now to FIG. 5, an application diagram method is depicted according to some embodiments of the present disclosure. Executing the method results in analyzing application, technology, and project information, and creating an application diagram that enables a user to identify a management action.

In box 502, an analysis module analyzes the technology roadmap information, the configuration information, and the project information. For example, the analysis module 112 analyzes the technology roadmap information from the technology roadmap database 102, the configuration information from the application database 104, and the project information from the project database 106. The analysis module 112 may analyze information either periodically or in response to user input via the user interface 110. The analysis module 112 may associate application information for each application with technology roadmap information for various technologies. For example, the analysis module 112 may associate application information for the retail analysis application 242 with technology roadmap information, such as the computer model X 310. The analysis module 112 may also associate application information for each application with project information for various projects. For example, the analysis module 112 may also associate application information for the retail analysis application 242 with project information, such as the marketing project 312.

In box 504, the user interface 110, responsive to user input, selects one or more projects, such as the marketing project 312 and the payment project 322. By selecting the marketing project 312 and the payment project 322, the user input is also selecting the applications impacted by the marketing project 312 and the payment project 322.

In box 506, the analysis module 112 creates the application diagram 200 for one or more projects, such as the marketing project 312 and the payment project 322. The application diagram 200 includes the applications impacted by the marketing project 312 and the payment project 322 within enterprise functional areas, such as the retail analysis application 242 in the sales enablement 216 area and the payment plus application 248 in the care enhancement 220 area.

The application diagram 200 also presents any changes planned for each selected project, such as planned modifications for the marketing project 312 indicated by dotted lines and planned modifications for the payment project 322 indicated by bold lines. The application diagram 200 may indicate modifications planned for projects by the use of dotted lines, bold lines, labels, colors, flashing, or other means. Dotted lines and bold lines are used for the purposes of illustrative examples. In this example, the application diagram 200 indicates that the marketing project 312 plans to modify the executive reporting application 238, the market strategy application 240, the retail analysis application 242, and the interfaces between these applications by depicting these applications and interfaces with dotted lines. Continuing this example, the application diagram 200 indicates that the payment project 322 plans modifications for the retail analysis application 242, the payment plus application 248, the collections application 250, and the interfaces between these applications by depicting these applications and interfaces with bold lines.

In box 508, a user interface, responsive to user input, displays the application diagram for the selected project. For example, the user interface 110, responsive to user input, displays the application diagram 200 for the marketing project 312 and the payment project 322. The application diagram 200 may identify an impact of one project on another project. For example, the dotted lines indicate that the marketing project 312 plans modifications for the executive reporting application 238, the market strategy application 240, and the retail analysis application 242, while the bold lines indicate that the payment project 322 plans modifications for the retail analysis application 242, the payment plus application 248, the collections application 250. Because the marketing project 312 and the payment project 322 each plan modifications for the retail analysis application 242, the marketing project 312 may impact the payment project 322. In response to viewing the retail analysis application 242, which is depicted by both the dotted lines of the marketing project 312 and the bold lines of the payment project 322, the user may identify a management action, such as inviting the project manager for the marketing project 312 and the project manager for the payment project 322 to a project coordinating meeting. Alternatively, the user may request, via the user interface 110, to display further information for the retail analysis application 242 or to generate a report for the retail analysis application 242 before identifying any management actions.

In box 510, a user interface optionally displays further information that enables a user to identify a management action responsive to further user input. For example, the user interface 110 responds to further user input by displaying further information in the application diagram 300 that enables the user to identify a management action. The further information may include information associated with a run location, a backup location, an application software type, an application software code, a database, an operating system, a computer, a budget, and a date. The run location may indicate any geographic location where an application is executed. The backup location may indicate a geographic location where a backup copy of an application is standing by, ready to be executed. The application software type may indicate a programming language, such as JAVA, used to code an application. The JAVA programming language is a platform independent architecturally neutral object-oriented programming language sold and/or distributed under the trademark of JAVA. The database may indicate a data store system used by an application, such as the data store system J 308. The operating system may indicate an operating system version used to control an application, such as the operating system version A 306. The computer may indicate a computer model that executes an application, such as the computer model X 310. The budget may indicate a budgeted amount of a project for modifying an application. The date may indicate when a technology offers support, when a modification is scheduled, or when technology used by an application will no longer be supported, such as a computer model that will become outdated in one year. Additionally, the further information may indicate a schedule for project milestone completions, such as modifications depicted by the application diagram 300 to the retail analysis application 242 by the date: July $2^{nd}$ 314 for the marketing project 312 and by the date: November $2^{nd}$ 324 for the payment project 322.

In response to viewing the further information depicted in the application diagram 300 for the retail analysis application 242, the user may identify a management action. The management action may modify a plan based on a synergy identified from a technology roadmap information date. For example, if the marketing project 312 has budgeted expenses to upgrade the retail analysis application 242 from the data store system J 308 to the data store system K 318 by the date: July $2^{nd}$ 314, while the payment project 322 has budgeted expenses to upgrade the retail analysis application 242 from the data store system J 308 to the data store system K 328 by the date: November $2^{nd}$ 324, then the user had identified redundant budget expenses. When the retail analysis application 242 is upgraded from the data store system J 308 to the data store system K 328 on the date: July $2^{nd}$ 314, the user may reallocate the budgeted expenses to upgrade the retail analysis application 242 from the data store system J 308 to the data store system K 328 by the date: November $2^{nd}$ 324.

The management action may modify a plan based on a dependency identified from a project information date. For example, the payment project 322 requires the retail analysis application 242 to be using the data store system K 328 by the date: November $2^{nd}$ 324, but the payment project has no budgeted expenses for upgrading the retail analysis application 242 from the data store system J 308 to the data store system K 328 because the marketing project 312 is already budgeted to upgrade the retail analysis application 242 from the data store system J 308 to the data store system K 318 by the earlier date: July $2^{nd}$ 314. In this situation, the payment project 322 is dependent on the marketing project 312, because if the marketing project 312 delays the upgrade for the retail analysis application 242 from the date: July $2^{nd}$ 314 until after the date: November $2^{nd}$ 324, the payment project 322 may be delayed.

The management action may modify a plan based on a risk identified from a technology roadmap information date. For example, while the marketing project 312 is scheduled to upgrade the retail analysis application 242 from the data store system J 308 to the data store system K 318 on the date: July $2^{nd}$ 314, the third party vendor that provides the data store system J 308 will no longer support the data store system J 308 by the date of June $2^{nd}$. In this situation, the user may modify the plan to upgrade the retail analysis application 242 from the data store system J 308 to the data store system K 318 on a new date of May $2^{nd}$ to avoid the risks involved with using unsupported technology.

The management action may modify a plan based on a conflict identified from the project information and/or the technology roadmap information. For example, while the marketing project 312 is scheduled to upgrade the retail analysis application 242 from the computer model X 310 to the computer model Y 320 by the date July $2^{nd}$ 314, the payment project 322 is scheduled to upgrade the retail analysis application 242 from the computer model X 310 to the computer model Z 330 by the date November $2^{nd}$. Replacing the computer model Y 320 only three months after upgrading to the computer model Y 320 may be a waste of budget expenses and resources. In response to identifying this situation in the application diagram 300, the user may reschedule the upgrade from the computer model X 310 to the computer model Z 330 by the date: July $2^{nd}$ 314.

In box 512, a report module optionally generates reports based on the analysis provided by the analysis module, wherein the reports are viewable by selection from the user interface. For example, the report module 114 generates the report 402 based on the analysis provided by the analysis module 112, wherein the user interface 110 displays the report 402 to the user. A report may identify an impact of a project on another project. For example, the report 402 indicates modifications to applications by the marketing project 312 by depicting the rows for these applications with dotted lines and modifications to applications by the payment project 322 by depicting the rows for these applications with bold lines. Because the report 402 depicts the row for the retail analysis application 242 with dotted lines and bold lines, the user that generated the report 402 may identify that the payment project 322 impacts the marketing project 312 by modifying the same application that is modified by the marketing project 312.

A report may be a technology report that specifies technology impact on selected applications. For example, the report 402 is a computer model report that specifies dates for when computer models are upgraded for selected applications. For this example, the computer model X 310 for the retail analysis application 242 is upgraded to the computer model Y 320 by the date: July $2^{nd}$ 314 and upgraded to the computer model Z 330 by the date: November $2^{nd}$ 324.

A report may be filtered based on the information. For example, a user may request a report based on data store systems for ongoing projects to evaluate whether project budgets may permit the upgrading of applications impacted by ongoing projects to a uniform standard for a data store system. The number of applications that are allocated technologies may make evaluating such a report excessively time-consuming without the benefit of filtering based on data store systems and applications that are impacted by ongoing projects.

In box 514, a second application diagram associated with a second selected time is optionally created, based at least in part on analyzing the information, wherein the second application diagram organizes applications in the context of enterprise functional areas. For example, after the analysis module 112 creates an application diagram for the marketing project 312, the analysis module 112 creates an application diagram for the payment project 322.

In box 516, the first application diagram and the second application diagram are optionally displayed for a comparison. For example, the application diagram for the payment project 322 and the application diagram for the marketing project 312 are displayed by the user interface 110 for a comparison of the application diagrams. The user interface 110 may compare application diagrams by displaying both application diagrams side by side, alternating between displaying each application diagram individually, by overlaying one application diagram over another application diagram, such as the application diagram 200, or by other methods. These methods of comparing application diagrams are described for the purposes of illustrative examples. Displaying the application diagrams may identify an impact of one project on another project. For example, displaying the payment project 322 overlaying the application diagram for the marketing project 312 may result in displaying the application diagram 200, which identifies the impact that each project has on the other due to the multiple modifications of the retail analysis application 242.

In box 518, a management action is identified based on the comparison. For example, based on the comparing the application diagram for the payment project 322 with the application diagram for the marketing project 312, a user prioritizes among accomplishing project deliverables. In this example, the user assigns a higher priority for the upgrade from the computer model X 310 to the computer model Z 330 for the retail analysis application 242 by rescheduling the upgrade from the date: November $2^{nd}$ 324 to the date: July $2^{nd}$ 314.

Figure 6:
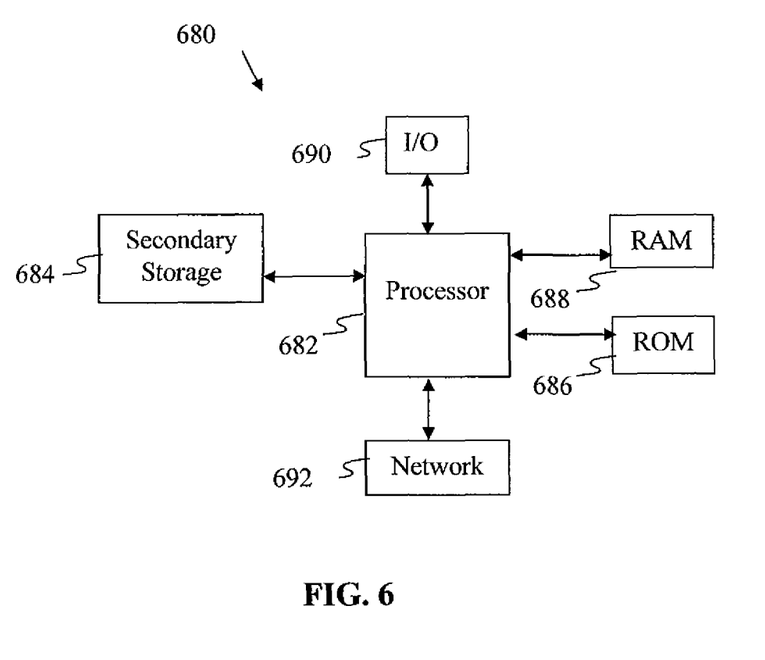
FIG. 6 illustrates an exemplary, general-purpose computer system suitable for implementing the several embodiments of the disclosure.

The system described above may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor may be implemented as one or more CPU chips.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage. The RAM 688 is used to store volatile data and perhaps to store instructions. Access to both ROM 686 and RAM 688 is typically faster than to secondary storage 684.

I/O devices 690 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 692 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave Such information, which may include data or instructions to be executed using processor 682, for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for creating an application diagram, comprising:
   a processor;
   a technology roadmap database comprising technology roadmap information defining a technology roadmap, wherein the technology roadmap identifies at least one of an approved operating system version, an approved computer model, an approved data store system, or an approved computer program execution framework;

an application database comprising configuration information about a plurality of applications, the configuration information identifying the technology resources allocated to each application, wherein the configuration information comprises whether an interface between applications of the plurality of applications communicates data in real time or by batching, and the data communication rate for the interface;

a project database-comprising project information about a plurality of projects, the project information identifying any project impact on each application, wherein each project of the plurality of projects comprises at least one of modifying or creating at least one application of the plurality of applications;

an analysis module that, when executed by the processor, is configured to analyze the technology roadmap information, the configuration information, and the project information and to create the application diagram for a selected project, wherein the application diagram organizes applications to be modified by the selected project and applications that interface with those modified applications into functional areas of an enterprise that are based on an enhanced telecom operations map (eTOM) and presents any changes planned for the selected project, and wherein the application diagram comprises an indicator pointing between applications to be modified by the selected project and the applications that interface with those modified applications; and a user interface that, responsive to user input, receives a selection of projects and displays the application diagram comprising the applications to be modified by the selected project and the applications that interface with those modified applications into the functional areas of the enterprise, wherein the application diagram presents the applications to be modified by the selected project and the applications that interface with those modified applications into the functional areas of the enterprise in a single display.

2. The system of claim 1, wherein the functional areas comprise billing, provisioning, network service assurance, care enablement, network resource management, security/privacy, and data warehouse/business intelligence.

3. The system of claim 1, wherein the project information identifies applications that are provided by third party vendors and wherein the application diagram depicts applications that are provided by third party vendors.

4. The system of claim 1, further including a report module in communication with the analysis module and configured to generate reports based on the analysis provided by the analysis module, wherein the reports are viewable by selection from the user interface.

5. The system of claim 1, wherein the configuration information comprises information associated with a plurality of interfaces between applications.

6. The system of claim 1, wherein the project information comprises a schedule for project milestone completion.

7. A computer implemented method for project management, comprising:

analyzing information about a plurality of projects, a technology roadmap, and application configurations, wherein the technology roadmap identifies at least one of an approved operating system version, an approved computer model, an approved data store system, or an approved computer program execution framework, wherein each project of the plurality of projects comprises at least one of modifying or creating at least one application of a first plurality of applications;

creating a first application diagram associated with a first selected time and a first selected project, based at least in part on analyzing the information, wherein the project is a payment project, wherein the first application diagram organizes the first plurality of applications to be modified by the first selected project and a second plurality of applications that interface with those modified applications in a context of functional areas of an enterprise that are based on an enhanced telecom operations map (eTOM), wherein the first plurality of applications comprise two or more of a retail analysis application, a payment plus application, and a collections application, and wherein the modification of the payment project requires the modification of the two or more of the retail analysis application, the payment plus application, and the collections application;

creating a second application diagram associated with a second selected time and a second selected project, based at least in part on analyzing the information, wherein the second application diagram organizes a third plurality of applications to be modified by the second selected project and a fourth plurality of applications that interface with those modified applications in the context of functional areas of the enterprise;

displaying the first application diagram with the second application diagram for comparison, wherein the first application diagram comprises the first plurality of applications to be modified by the first selected project and the second plurality of applications that interface with those modified applications into the functional areas of the enterprise, and wherein the second application diagram comprises the third plurality of applications to be modified by the second selected project and the fourth plurality of applications that interface with those modified applications into the functional areas of the enterprise;

identifying, by at least one of the first application diagram, the second application diagram, or the report, an impact of a first project on at least one other project;

modifying, based on the identification of the impact, at least one of the first project or the at least one other project; and identifying a management action based on the comparison.

8. The computer implemented method of claim 7, further including generating a report based on analyzing the information.

9. The computer implemented method of claim 8, wherein the report comprises a technology report that specifies technology impact on selected applications.

10. The computer implemented method of claim 7, further comprising filtering the report based on the information.

11. The computer implemented method of claim 7, wherein the management action comprises prioritizing among accomplishing a plurality of project deliverables.

12. A system for creating an application diagram, comprising a processor;

a memory that comprises application information for each of a plurality of applications, technology roadmap information for each of a plurality of technologies, and project information for each of a plurality of projects, wherein the technology roadmap identifies at least one of an approved operating system version, an approved computer model, an approved data store system, or an approved computer program execution framework, and wherein each project of the plurality of projects comprises one of modifying or creating at least one application of the plurality of applications;

a database manager executed by the processor to:
  analyze the application information, the technology roadmap information, and the project information,
  create the application diagram for a selected project, wherein application information for each application is associated with technology roadmap information for at least one of the plurality of technologies and application information for each application is associated with project information for at least one of the plurality of projects, and wherein the application diagram organizes applications to be modified by the selected project and applications that interface with those modified applications into functional areas of an enterprise that are based on an enhanced telecom operations map (eTOM),
  identify, from at least one of the project information and the technology roadmap information, a conflict, and modify, based on the conflict identified, a plan; and
a user interface that, responsive to user input, displays the application diagram comprising the applications to be modified by the selected project and the applications that interface with those modified applications into the functional areas of the enterprise, and that displays further information that enables a user to identify a management action responsive to further user input.

13. The system of claim 12, wherein the further information comprises at least one of information associated with a run location, a backup location, an application software type, an application software code, a database, an operating system, a computer, a budget, or a date.

14. The system of claim 12, wherein the management action comprises modifying a plan based on a dependency identified from a project information date.

15. The system of claim 12, wherein the management action comprises modifying a plan based on a synergy identified from a technology roadmap information date.

16. The system of claim 12, wherein the management action comprises modifying a plan based on a risk identified from a technology roadmap information date.

17. The computer implemented method of claim 7, wherein the payment plus application interfaces with at least one of the collections application and a service scope application, wherein the collections application interfaces with at least one of an invoicing application or a third party vendor tax application, wherein a treasury application interfaces with the invoicing application and the third party vendor tax application, and wherein at least one of the invoicing application and the third party vendor tax application is impacted by modifications to the collections application.

* * * * *